US010392712B2

(12) United States Patent
Liu et al.

(10) Patent No.: US 10,392,712 B2
(45) Date of Patent: Aug. 27, 2019

(54) CHEMICAL INHIBITION OF PITTING CORROSION IN METHANOLIC SOLUTIONS CONTAINING AN ORGANIC HALIDE

(71) Applicant: Baker Hughes, a GE company, LLC, Houston, TX (US)

(72) Inventors: Zhengwei Liu, Sugar Land, TX (US); Sunder Ramachandran, Sugar Land, TX (US); Vaithilingam Panchalingam, Friendswood, TX (US); Timothy Z. Garza, Dickinson, TX (US); Paul Robert Stead, Sugar Land, TX (US); Stuart Edward Cook, Houston, TX (US); Gordon T. Rivers, Houston, TX (US); Vu Thieu, Houston, TX (US); Heather McEachern, Webster, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 15/644,755

(22) Filed: Jul. 8, 2017

(65) Prior Publication Data

US 2017/0306505 A1 Oct. 26, 2017

Related U.S. Application Data

(62) Division of application No. 14/514,626, filed on Oct. 15, 2014, now Pat. No. 9,732,430.

(60) Provisional application No. 61/895,155, filed on Oct. 24, 2013.

(51) Int. Cl.
| | | |
|---|---|---|
| C09K 8/52 | (2006.01) | |
| C09K 8/54 | (2006.01) | |
| C23F 11/08 | (2006.01) | |
| C23F 11/10 | (2006.01) | |
| C23F 11/12 | (2006.01) | |
| C23F 11/14 | (2006.01) | |

(52) U.S. Cl.
CPC ............ *C23F 11/124* (2013.01); *C09K 8/52* (2013.01); *C09K 8/54* (2013.01); *C23F 11/08* (2013.01); *C23F 11/10* (2013.01); *C23F 11/143* (2013.01); *C09K 2208/20* (2013.01); *C09K 2208/22* (2013.01); *C09K 2208/32* (2013.01)

(58) Field of Classification Search
CPC .................................. C09K 8/54; C23F 11/124
See application file for complete search history.

(56) References Cited

U.S. PATENT DOCUMENTS

| | | |
|---|---|---|
| 2,758,970 A | 8/1956 | Saukaitis et al. |
| 2,814,593 A | 11/1957 | Beiswanger et al. |
| 2,993,863 A | 7/1961 | Monroe et al. |
| 3,077,454 A | 2/1963 | Monroe et al. |
| 3,107,221 A | 10/1963 | Harrison et al. |
| 3,382,179 A | 5/1968 | Keeney et al. |
| 3,404,094 A | 10/1968 | Keeney |
| 3,514,410 A | 5/1970 | Engle et al. |
| 3,773,645 A | 11/1973 | Nees et al. |
| 3,992,313 A | 11/1976 | Anderson et al. |
| 4,104,303 A | 8/1978 | Anderson et al. |
| 4,512,522 A | 4/1985 | Williams |
| 4,871,024 A | 10/1989 | Cizek |
| 4,997,040 A | 3/1991 | Cizek |
| 5,062,992 A | 11/1991 | McCullough |
| 5,366,643 A | 11/1994 | Walker |
| 5,468,303 A | 11/1995 | Thomas, Sr. |
| 5,591,381 A | 1/1997 | Walker |
| 5,763,368 A | 6/1998 | Brezinski |
| 6,595,911 B2 | 7/2003 | Lovuolo |
| 6,596,911 B2 | 7/2003 | Przybylinski et al. |
| 7,662,970 B2 | 2/2010 | Rivers et al. |
| 8,134,011 B2 | 3/2012 | Rivers et al. |
| 9,732,430 B2 | 8/2017 | Liu et al. |
| 2005/0263407 A1 | 12/2005 | Brusic et al. |
| 2011/0302827 A1 | 12/2011 | Jackson et al. |
| 2012/0172604 A1 | 7/2012 | Rivers et al. |
| 2013/0261039 A1 | 10/2013 | Little |

FOREIGN PATENT DOCUMENTS

WO          96-11169 A1    4/1996

OTHER PUBLICATIONS

Tajima, S. et al., "Pitting of Stainless Steels in Organic Acid-Methanol Electrolyte," Corrosion Science vol. 16, pp. 191-193 (1976).
Sekine, I., et al., "Analysis for Corrosion Behavior of Mild Steels in Various Hydroxy Acid Solutions by New Methods of Surface Analyses and Electrochemical Measurements," J. Electrochem. Soc., vol. 137, No. 10, pp. 3029-3033 (1990).
Tsang, Y.H. et al., "Localized Corrosion Testings of Stainless Steel in Low-Dose Hydrate Inhibitor by Cyclic Potentiodynamic Polarization," OTC 22539 (2011).
European Search Report in 14855922.2, dated May 22, 2017.

*Primary Examiner* — Peter F Godenschwager
(74) *Attorney, Agent, or Firm* — Mossman, Kumar & Tyler, P.C.

(57) ABSTRACT

Pitting corrosion of stainless steel occurs in solutions of organic acid, such as tartaric acid, in an electrolyte solution with methanol. However, methanolic solutions containing at least one organic halide and at least one organic hydroxyl-acid and some water provide reduced pitting corrosion of stainless steel. The organic hydroxyacid may be a hydroxy acid containing 2 to 10 carbon atoms with at least one hydroxyl group and at least one carboxylic acid group, in a non-limiting example, glycolic acid. The pH of the methanolic solution may range from about 3.5 to about 8.

18 Claims, 1 Drawing Sheet

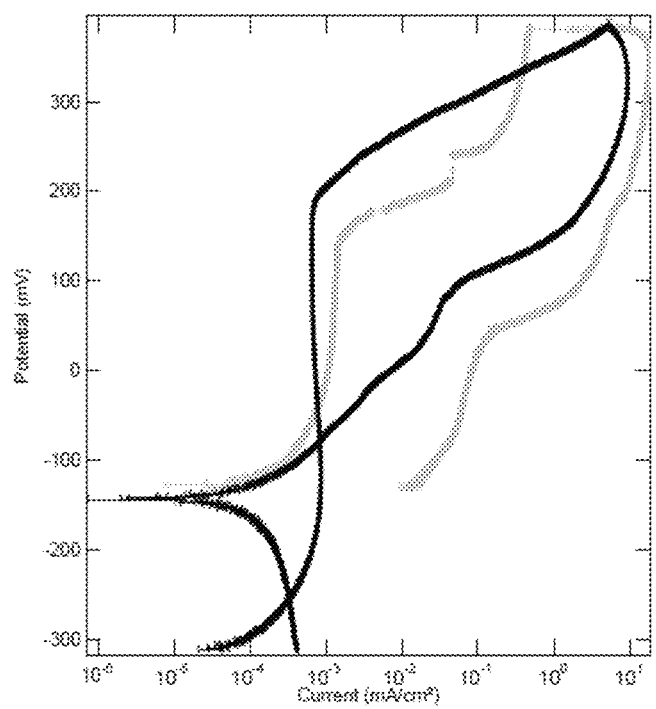

CHEMICAL INHIBITION OF PITTING CORROSION IN METHANOLIC SOLUTIONS CONTAINING AN ORGANIC HALIDE

CROSS-REFERENCE TO RELATED APPLICATION

This application is a divisional application of U.S. patent application Ser. No. 14/514,626 filed Oct. 15, 2014, issued Aug. 15, 2017 as U.S. Pat. No. 9 732 430, which in turn claims the benefit of U.S. Provisional Patent Application Ser. No. 61/895,155, filed Oct. 24, 2013, both of which are incorporated herein in their entireties by reference.

TECHNICAL FIELD

The invention relates to methods and compositions for inhibiting corrosion of metals, and, in one aspect, more particularly relates to methods and compositions for inhibiting pitting corrosion of stainless steel, and still more particularly relates to anti-agglomerate (AA) hydrate inhibiting compositions that have improved inhibition of pitting corrosion of stainless steel.

TECHNICAL BACKGROUND

It is well known that certain stainless steel alloys experience pitting corrosion and will corrode in the presence of halide (e.g. chloride, bromide, etc.) environments. While the rate at which corrosion will occur depends on a number of factors, such as the steel alloy itself, the hydrogen concentration of the solution often measured as the negative logarithm of the hydrogen ion activity known as pH, the temperature of the environment, the length of contact, etc., some sort of corrosion invariably occurs. Pitting corrosion is especially severe and can cause failure of the equipment. Alloy technology has provided materials to withstand the incidental contact of steel with many different solutions, but the corrosion problem is particularly aggravated when there is no choice but to contact steel with halide-containing material or fluids, as in the case of chemical processing where substances containing halides are employed. In some instances attention has turned toward providing corrosion inhibitors in the medium itself to prevent corrosion of the steel surfaces that it must come into contact with, yet still deliver the acid to its ultimate destination.

Specific environments in which an improved corrosion inhibitor would be appreciated include industrial cleaning and hydrocarbon recovery operations. With respect to oil and gas production, it is well known that during the production life of an oil or gas well, the production zone within the well may be chemically treated or otherwise stimulated to enhance the economical production lifetime of the well.

The vast majority of production and workover conduits comprise carbon steels. These steels were utilized either temporarily or permanently in the well, and treatment and/or stimulation fluids were introduced through them into the well. Sometimes primarily in the drilling and completion of many subterranean wells through formations which contain high concentrations of corrosive fluids such as hydrogen sulfide, carbon dioxide, brine, and combinations of these constituents, the production and workover conduits for use in the wells are now made of high alloy steels. The high alloy steels include, but are not necessarily limited to, chrome steels, duplex steels, stainless steels, martensitic alloy steels, ferritic alloy steels, austenitic stainless steels, precipitation-hardened stainless steels, high nickel content steels, and the like. Often, treatment chemicals are introduced into wells and pipelines in umbilicals that are made of high alloy steels. The high alloy steels include, but are not necessarily limited to, chrome steels, duplex steels, stainless steels, martensitic alloy steels, ferritic alloy steels, austenitic stainless steels, precipitation-hardened stainless steels, high nickel content steels, and the like.

Various corrosion inhibitors are known, to which are added other components, such as intensifiers, surfactants, oil wetting components, and the like. U.S. Pat. No. 2,758,970 describes derivatives of rosin amines, which are represented by the formula:

where R is a radical selected from the group consisting of abietyl, hydroabietyl, and dehydroabietyl, Y is the group $CH_2R_1$, X is a radical selected from the group consisting of hydrogen and $CH_2R_1$, and $R_1$ represents alpha ketonyl groups. These rosin amines are noted as useful in reducing the rate of corrosion of metals such as magnesium, aluminum and zinc when they are exposed to the action of a corrosive material such as hydrochloric acid.

Further, U.S. Pat. No. 3,077,454 describes compositions for inhibiting corrosion made by combining certain active hydrogen containing compounds with organic ketones having at least one hydrogen atom on the carbon atom alpha to the carbonyl group and an aldehyde selected from the group consisting of aliphatic aldehydes containing from 1 to 16 carbons, and aromatic aldehydes of the benzene series, having no functional groups other than aldehyde groups, and a fatty acid.

Additionally, Mannich base and thiourea inhibitor compositions and methods of inhibiting the acid attack by aqueous hydrofluoric acid on ferrous metal surfaces, and in particular highly reactive ferrous metal surfaces, are described in U.S. Pat. Nos. 3,992,313 and 4,104,303.

It is also known in the corrosion inhibition art to provide various corrosion inhibition aids (sometimes called corrosion inhibitor intensifiers or simply intensifiers) which are used together with the above and other known corrosion inhibitors. For instance, U.S. Pat. No. 4,871,024 to Cizek (Baker Hughes Incorporated) describes copper metal salt intensifiers and U.S. Pat. No. 4,997,040 to Cizek (Baker Hughes Incorporated) relates to certain acid soluble mercury metal salt intensifiers.

U.S. Pat. No. 3,773,465 concerns an inhibited treating acid for use in contact with ferrous surfaces at temperatures of from about 150° F. to about 450° F. (about 66 to about 232° C.) which contains cuprous iodide (CuI; copper (I) iodide) in a concentration of from about 25 to about 25,000 ppm by weight of the acid. The patent notes that it was discovered that the cuprous iodide produced in situ by reactants which also form free iodine will operate in the inventive manner therein, but show a smaller degree of improvement as compared with combining preformed cuprous iodide with an acid. Thus, the patent teaches that the most preferred reactants for producing cuprous iodide in situ are those which do not produce free iodine.

Gas hydrate inhibitors may sometimes contain acids which may cause pitting corrosion when they come into contact with stainless steel. A number of hydrocarbons, especially lower-boiling light hydrocarbons, in subterranean formation fluids or natural gas are known to form hydrates in conjunction with the water present in the system under a variety of conditions—particularly at the combination of lower temperature and higher pressure. The hydrates usually exist in solid forms that are essentially insoluble in the fluid itself. As a result, any solids in a formation or natural gas fluid are at least a nuisance for production, handling and transport of these fluids. It is further not uncommon for hydrate solids (or crystals) to cause plugging and/or blockage of pipelines or transfer lines or other conduits, valves and/or safety devices and/or other equipment, resulting in shutdown, loss of production and risk of explosion or unintended release of hydrocarbons into the environment either on-land or off-shore. Accordingly, hydrocarbon hydrates—particularly preventing or inhibiting their occurrence and growth—have been of substantial interest as well as concern to many industries, particularly the petroleum and natural gas industries.

Hydrocarbon hydrates are clathrates, and are also referred to as inclusion compounds. Clathrates are cage structures formed between a host molecule and a guest molecule. A hydrocarbon hydrate generally is composed of crystals formed by water host molecules surrounding the hydrocarbon guest molecules. The smaller or lower-boiling hydrocarbon molecules, particularly $C_1$ (methane) to $C_4$ hydrocarbons and their mixtures, are more problematic because it is believed that their hydrate or clathrate crystals are easier to form. For instance, it is possible for ethane to form hydrates at as high as 4° C. at a pressure of about 1 MPa. If the pressure is about 3 MPa, ethane hydrates can form at as high a temperature as 14° C. Even certain non-hydrocarbons such as carbon dioxide, nitrogen and hydrogen sulfide are known to form hydrates under certain conditions.

There are two broad techniques to overcome or control the hydrocarbon hydrate problems, namely thermodynamic and kinetic. For the thermodynamic approach, there are a number of reported or attempted methods, including water removal, increasing temperature, decreasing pressure, addition of "antifreeze" to the fluid and/or a combination of these. One type of "antifreeze" is methanol. The kinetic approach generally attempts (a) to prevent the smaller hydrocarbon hydrate crystals from agglomerating into larger ones (known in the industry as an anti-agglomerate and abbreviated AA) and/or (b) to inhibit and/or retard initial hydrocarbon hydrate crystal nucleation; and/or crystal growth (known in the industry as a kinetic hydrate inhibitor and abbreviated KHI). Thermodynamic and kinetic hydrate control methods may be used in conjunction.

Quaternary amine chemistry has been proven to be effective for many applications, including, but not necessarily limited to disinfectants, surfactants, fabric softeners, antistatic agents, corrosion inhibitors for carbon dioxide and hydrogen sulfide corrosion of mild steel, as AA for hydrate control, and the like. However, water quality and fluids separation issues upon the application of quaternary amines are industrial-wide technical challenges, therefore thwarting their broad field implementation to replace conventional thermodynamic hydrate inhibitor (THI) methods. Derivatives from quaternary amine technology that itself possesses potentially severe corrosive tendency, such as betaine, also present similar challenges, irrespective of higher raw material cost (RMC) and complex synthesis routes.

It would be advantageous if corrosion inhibitor compositions were discovered that would be an improvement over the presently known systems containing organic halides. For example, it would be desirable if a methanolic solution which contained an organic halide also contained a corrosion inhibitor that would reduce corrosion, particularly pitting corrosion of the stainless steel that it contacted. There also remains a need for new corrosion inhibitor compositions and methods of use therefore which would work in other acid environments for a wide variety of metals, particularly iron alloys such as steels.

SUMMARY

There is provided, in one non-limiting embodiment, a methanolic solution that includes, but is not necessarily limited to, water, methanol, at least one organic halide, and at least one organic hydroxyacid, and/or alkaline metal salts thereof, and/or amine salts of these organic hydroxyacids.

Further in another non-restrictive version, there is provided a method of inhibiting corrosion, which method comprising contacting a methanolic solution with a metal. Again, the methanolic solution includes, but is not necessarily limited to, water, methanol, at least one organic halide, and at least one compound, which may be an organic hydroxyacid, and/or alkaline metal salts of these hydroxyacids, and/or amine salts of these hydroxyacids. The corrosion of the metal is inhibited to a greater extent as compared to an otherwise identical methanolic solution absent the at least one compound.

BRIEF DESCRIPTION OF THE DRAWINGS

FIG. 1 is a graph of potential in mV as a function of current in $mA/cm^2$ showing the effect of pH on the polarization of stainless steel in solutions with the same methanolic solution at a low pH (in gray) and a high pH (in black).

DETAILED DESCRIPTION

It has been surprisingly discovered that in contrast to the pitting corrosion of stainless steel found in tartaric acid-methanol systems as found by S. TAJIMA, et al. in "Pitting of Stainless Steels in Organic Acid-Methanol Electrolyte," Corrosion Science, 1976, Vol. 16, Issue 3, pp. 191-192, a chemical inhibition solution using an organic hydroxyacid may control pitting corrosion in methanolic solutions containing organic chlorides. Localized pitting corrosion susceptibility of stainless steel, evaluated using a cyclic potentiodynamic polarization (CPP) method, was greatly reduced using the organic hydroxyacid, particularly within certain pH ranges. Further, in one non-limiting embodiment, a lower pitting susceptibility of stainless steel was achieved for a reformulated methanolic solution containing an organic hydroxyacid and a certain amounts of water in a particular pH range.

In many prior formulations an organic acid is used as one component out of four or more components in the corrosion inhibitor or chemical cleaning solutions. It was additionally surprisingly discovered that improved inhibition of pitting corrosion could not be achieved in a methanol-containing and halide-containing solution by using an organic hydroxyacid in combination with a number of other corrosion inhibitors. It was discovered that, in one non-limiting embodiment, using the organic hydroxyacid alone (that is, not as part of a multi-component system) in a particular pH range and in the presence of a particular amount of additional water can greatly reduce the pitting corrosion susceptibility of stainless steel in methanol-containing and halide-containing solutions.

Material compatibility with storage tanks, injection tubing and umbilical tubes for deep sea applications is a mandatory requirement for chemical products. Many proposed products fail at the last step of commercialization because of material compatibility issues, thereby are found to cause localized corrosion, particularly pitting corrosion of stainless steel. A chemical solution to overcome this pitting problem in methanol-containing and halide containing solutions was discovered, as described herein. Many solutions have methanol present as a solvent for lower viscosity and low temperature stability. For instance, the compositions and methods described in U.S. Pat. No. 6,596,911 to John L. Przybylinski and Gordon T. Rivers (Baker Hughes Incorporated) use methanol as a solvent; incorporated by reference herein in its entirety.

Another common approach to address the pitting corrosion problem is to use an aromatic solvent instead of methanol and a relatively minimum amount of water. However, the trade-off is that the resulting solution has high viscosity, which will limit its use in deep water applications and potentially cause injection difficulty. In contrast, the methanolic solutions and methods of using them as described herein are expected to be injected according to currently accepted procedures while also inhibiting pitting corrosion.

As previously mentioned, the methanolic solutions herein have at least four components: water, methanol, at least one organic halide, and at least one organic hydroxyacid. In one non-restrictive version, these are the only four components. In one non-limiting embodiment, the water proportion ranges from about 0.01 independently to about 12 wt %, in another non-limiting embodiment from about 0.5 independently to about 10 wt %, alternatively from about 2 wt % independently to about 6 wt %. As used herein with respect to ranges, the term "independently" means that any lower threshold may be combined with any upper threshold to form a suitable alternative range.

The methanol proportion may range from about 5 independently to about 70 wt %, in another non-limiting embodiment from about 10 independently to about 60 wt %, alternatively from about 15 independently to about 50 wt %. The at least one organic halide proportion ranges from about 0.5 independently to about 80 wt %, in another non-limiting embodiment from about 5 independently to about 70 wt %, and alternatively from about 10 independently to about 60 wt %. The at least one organic hydroxyacid (or amine salt or alkaline metal salt thereof) may be present from about 0.5 independently to about 10 wt %, alternatively from about 0.75 independently to about 3.5 wt %. In the case of dibutylamine glycolate, a proportion of about 0.1 independently to 5 wt %, alternatively 0.5 up about 1.2 wt % in the methanolic solution may be suitable. Alternatively, where the at least one organic hydroxyacid is glycolic acid, about 0.3 wt % to about 0.9 wt % may be a suitable proportion range; alternatively about 0.6 wt % may be a suitable proportion.

The pH of the methanolic solution may range from about 3.5 independently to about 8; in one non-limiting embodiment from about 4.0 independently to about 7.5; in a different non-restrictive version from about 4.6 independently to about 7.0; alternatively from about 4.9 independently to about 6.5.

Suitable organic halides include, but are not necessarily limited to, quaternary ammonium halides (e.g. chlorides, bromides, etc.), organic oxazolidinium halides (e.g. chlorides, bromides, etc.), and the like, and combinations thereof, including, but not necessarily limited to those of U.S. Pat. Nos. 7,662,970 and 8,134,011 and U.S. Patent Application Publication No. 2012/00172604 A1 (Rivers, et al., all assigned to Baker Hughes Incorporated), all incorporated by reference herein in their entirety. Generally, these organic oxazolidinium halides (e.g. chlorides, bromides, etc.) employ mixtures of oxazolidinium compounds prepared by a method comprising reacting an aldehyde and/or a ketone with a secondary amine and a reactant selected from the group consisting of a halohydrin and an epoxide, under reaction conditions sufficient to produce the mixture of oxazolidinium compounds. In general, the hydrate-forming guest molecules may include, but are not necessarily limited to, methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, xenon, and mixtures thereof.

The onium compounds and amine salts of U.S. Pat. No. 6,595,911, previously mentioned, are also suitable components in the methods and compositions described herein.

In one non-limiting embodiment, the at least one organic hydroxyacid is a hydroxy acid containing 2 to 10 carbon atoms with at least one hydroxyl group and at least one carboxylic acid group. Suitable organic hydroxyacids include, but are not necessarily limited to, 2-hydroxyacetic acid (glycolic acid), 2-hydroxypropanoic acid (lactic acid), 3-hydroxypropanoic acid (hydracrylic acid), 2-hydroxysuccinic acid (malic acid), citric acid, 2-hydroxybutyric acid (alpha-hydroxybutyric acid), 2-hydroxybutyric acid (beta-hydroxybutyric acid, 4-hydroxybutyric acid (gamma-hydroxybutyric acid), 2-hydroxybenzoic acid (salicylic acid), 3-hydroxybenzoic acid, 4-hydroxybenzoic acid, 3,4,5-trihydroxybenzoic acid (gallic acid), and combinations thereof. Further and alternatively, the at least one organic hydroxyacid may include, but not necessarily be limited to, ethanolamine salt of glycolic acid, the butyl amine salt of glycolic acid, the dibutylamine salt of glycolic acid, and combinations thereof. In another non-limiting embodiment the at least one organic hydroxyacid has an absence of tartaric acid and/or an absence of malic acid and/or an absence of citric acid.

Additionally, the methanolic solution and/or method of inhibiting corrosion using the methanolic solution described herein may be practiced in the absence of ethanol. Further, the methanolic solution and/or method of inhibiting corrosion using the methanolic solution described herein may be practiced in the absence of a fuel, particularly in the absence of a transportation fuel, and even more particularly in the absence of gasoline and diesel. Transportation fuel may include, but is not necessarily limited to gasoline, diesel, jet fuel, biodiesel, ethanol, propane, and the like.

As previously mentioned, the methanolic solution has improved pitting corrosion with respect to stainless steel as compared with an otherwise identical methanolic solution absent the at least one organic hydroxyacid. In a different non-limiting embodiment, the at least one organic hydroxyacid is the only corrosion inhibitor in the methanolic solution.

While it is expected that methods and compositions using the methanolic solution as described herein will find particular applicability in the inhibition and/or prevention of pitting corrosion of stainless steels, it should be further appreciated that the methods and compositions using the methanolic solution as described herein will find particular applicability in the inhibition and/or prevention of corrosion for mild steels, and/or for the inhibition and/or prevention of general corrosion. I. SEKINE, et al., "Analysis for Corrosion Behavior of Mild Steels in Various Hydroxy Acid Solutions by New Methods of Surface Analysis and Electrochemical Measurements," *J. Electrochemical Soc.*, Vol 137, No. 10, October 1990, pp. 3029-3033 indicated that corrosion rates of mild steel with aqueous glycolic acid solutions is lower than other hydroxyacid solutions. However, corrosion inhibition is not mentioned. It may be further discovered that the methanolic solutions described herein may also find utility in applications for the prevention or inhibition of scale formation.

The dosage or effective amount of methanolic solution corrosion inhibitor may vary greatly depending on the type of chemistry used, and other factors including, but not necessarily limited to the acid used, the acid strength, tubular metallurgy (the nature of the steel contacted), the temperature of the well system, expected acid exposure time, the nature or composition of the mixture of water and hydrate-forming guest molecules, etc. However, in one non-limiting embodiment, the amount of corrosion inhibitor in the total aqueous acidic composition (including water, acid and corrosion inhibitor) may range from about 0.01 independently to about 10 vol %, in another non-limiting embodiment from about 0.1 independently to about 8 volume %, alternatively from about 0.2 independently to about 5 volume %; and in another non-limiting embodiment from about 0.3 independently to about 3 volume %.

Alternatively, additional corrosion inhibitors which may be used with the methanolic solutions include, but are not necessarily limited to Mannich reaction products, quaternary amine compounds, acetylenic alcohols and combinations thereof. In one non-limiting embodiment, useful corrosion inhibitor bases are the Mannich reaction products, which may include, but are not necessarily limited to, the materials of U.S. Pat. Nos. 3,077,454; 5,366,643; and 5,591,381. The products of U.S. Pat. No. 3,077,454 may be made with approximately a 50% yield, and they require the presence of a fatty acid, such as a tall oil fatty acid, in one non-limiting embodiment. The texts of these patents are incorporated by reference herein. More specifically, the Mannich reaction product may be the product of reaction of
  (i) one mole of an ammonia derivative having at least one hydrogen attached to nitrogen and having no groups reactive under the conditions of reaction other than hydrogen,
  (ii) from 1.5 to 10 moles of a carbonyl compound having at least one hydrogen atom on the carbon atom adjacent to the carbonyl group,
  (iii) from 2 to 10 moles of an aldehyde different from the carbonyl compound selected from the group consisting of aliphatic aldehydes having from 1 to 16 carbon atoms and aromatic aldehydes of the benzene series and having no functional groups other than aldehyde groups, and
  (iv) from 0.6 to 24 parts by weight based on (1), (2), and (3) of an organic acid having from 1 to 20 carbon atoms,
at a temperature of from about 150° F. (66° C.) to about 250° F. (121° C.) for from about 1 to 16 hours.

One suitable non-limiting Mannich reaction based acid corrosion inhibitor is comprised of the condensation reaction product of 1,3-dibutyl thiourea and acetophenone. Baker Hughes CI 200 is a corrosion inhibitor of this type. They contain acetylenic alcohols as well as oxyalkylated alcohol surfactant dispersants, in a co-solvent system containing methanol and fatty acid derivatives.

Baker Hughes CI 300 is a suitable quinoline quaternary amine-based acid corrosion inhibitor containing cinnamic aldehyde, as well as oxyalkylated linear alcohol dispersants in a mixed solvent system containing primary alcohols and aromatic naphtha.

Suitable quaternary amine compounds may include, but are not necessarily limited to, the nitrogen-substituted heterocycles of 6 to 10 members quaternized with alkyl halides, also commonly referred to as coal tar based quats. These materials are typically quinolines, pyridines and the like quaternized with alkyl and/or aryl halides, where the alkyl or aryl group may range from methyl to benzyl ($C_1$ to $C_6$). Naphthyl quinoline quats are included in this group. Further information may be found with reference to U.S. Pat. No. 2,814,593, incorporated by reference herein in its entirety, which discusses benzyl chloride quats of quinoline.

Other optional ingredients may be used with the corrosion inhibitor herein, and may include, but are not necessarily limited to, any acetylenic compound such as acetylenic alcohols; cinnamaldehyde; nitrogen compounds, such as a quarternary ammonium compounds; solvents such as alcohols or ketones; and aromatic hydrocarbons or mixtures thereof, as are known to those skilled in the art. For example, teachings from acid corrosion inhibitors as made and described in U.S. Pat. Nos. 3,514,410; 3,404,094; 3,107,221; 2,993,863; and 3,382,179; may be utilized herein. All of these patents are hereby incorporated by reference herein in their entirety. In one non-restrictive embodiment, the corrosion inhibitor contains at least one acetylenic alcohol having from 3 to 10 carbon atoms. In another non-limiting embodiment herein however, the corrosion inhibitor excludes and/or has an absence of acetylenic alcohol.

Examples of acetylenic compounds that may be optionally used include propargyl alcohol (2-propyn-1-ol), hexynol, dimethyl hexynol, diethyl hexynediol, dimethyl hexynediol, ethyl octynol, dimethyl octynediol, methyl butynol, methyl pentynol, ethynyl cyclohexynol, 2-ethyl hexynol, phenyl butynol, and ditertiary acetylenic glycol.

Other acetylenic compounds which can be optionally employed include, but are not limited to, butynediol; 1-ethynylcyclohexanol; 3-methyl-1-nonyn-3-ol; 2-methyl-3-butyn-2-ol; also 1-propyn-3-ol; 1-butyn-3-ol; 1-pentyn-3-ol; 1-heptyn-3-ol; 1-octyn-3-ol; 1-nonyn-3-ol; 1-decyn-3-ol; 1-(2,4,6-trimethyl-3-cyclohexenyl)-3-propyne-1-ol; and in general acetylenic compounds having the general formula:

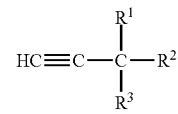

wherein $R^1$ is —H, —OH, or an alkyl radical; $R^2$ is —H, or an alkyl, phenyl, substituted phenyl or hydroxyalkyl radical; and $R^3$ is —H or an alkyl, phenyl, substituted phenyl or hydroxyalkyl radical.

The nitrogen or ammonia compounds that can be optionally employed herein, may include, but are not limited to, those amines having from 1 to 24 carbon atoms in each alkyl moiety as well as the six-membered heterocyclic amines, for example, alkyl pyridines, crude quinolines and mixtures thereof. This includes such amines as ethylamine, diethylamine, triethylamine, propylamine, dipropylamine, tripropylamine, mono-, di- and tripentylamine, mono-, di- and trihexylamine and isomers of these such as isopropylamine, tertiary-butylamine, etc. This also includes alkyl pyridines having from one to five nuclear alkyl substituents per pyridine moiety, such alkyl substituents having from one to 12 carbon atoms, and preferably those having an average of six carbon atoms per pyridine moiety, such as a mixture of high boiling tertiary-nitrogen-heterocyclic compounds, such as HAP (high alkyl pyridines), Reilly 10-20 base and alkyl pyridines H3. Other nitrogen compounds include the crude quinolines having a variety of substituents.

The corrosion inhibitor may also contain a number of other constituents, such as fatty alcohol adducts, nonyl phenol adducts and tallow amine adducts, tall oil adducts, such as surfactants. Oil wetting components, such as heavy aromatic solvents, may also be present. In another non-limiting embodiment, the corrosion inhibitor contains at least one saturated alcohol having from 1 to 5 carbon atoms, and at least one alkyl phenol or alkoxylated alkyl phenol having from 15 to 24 carbon atoms.

Emulsion-preventing surfactants may also be useful to prevent adverse interaction between the acid and the reservoir fluids. Suitable commercial surfactants include, but are not necessarily limited to, Baker Hughes NE-100 surfactant. These surfactants may be blends of polyglycols, and may be described as containing 2-ethylhexanol, ethoxyated alcohol, heavy aromatic naphtha, isopropyl alcohol and methanol. They may contain other proprietary surfactants. Many conventional emulsion-breaking surfactants are derived from polyols, esters or resins, with each family having a particular or specialized function such as speed of oil/water separation, oil/water interface quality and oil carryover in the water phase. Baker Hughes also sells AQUET™ 946 and AQUET™ AR30 non-emulsifiers. Typical dosages of emulsion-preventing surfactants may range from about 0.1 to about 0.5% by volume of the aqueous acid composition.

It will be appreciated that the compositions and methods herein will have applicability to other industries besides petroleum recovery, including, but not necessarily limited to, water wells, cleaning industrial machinery, pickling steel in acid, gas hydrate inhibition, other upstream chemical such as scale inhibitors and water clarifiers, pumping acids through pipes, pipelines and other conduits, and other applications where it is desirable to reduce corrosion, such as chemical processes that necessarily require the contact of acids etc. While the specific implementation of the methods and compositions herein is described in the context of the oil patch, they may certainly find uses in conduits, fittings, and other equipment, such as industrial cleaning applications. It will be appreciated that one of ordinary skill in the art of corrosion inhibition will be able to adapt the teachings herein to applications outside the realm of oil and gas recovery, such as the area of chemical processing, with only routine experimentation.

It will also be appreciated that it is not necessary that corrosion be entirely prevented for the methods described herein to be considered successful, although corrosion prevention is a goal. The methods may be considered successful if corrosion is inhibited or reduced as compared with an identical methanolic solution composition which does not have at least one organic hydroxyacid, as described herein.

In the implementation of the methods and corrosion inhibitors herein in the production of fluids from subterranean reservoirs, a fluid may be introduced through a high alloy steel member or conduit positioned within the well. The corrosion inhibitor herein is introduced, added, or injected into the fluid. As noted, the fluid may contain an acid. The fluid may be an acidic injection medium and in most cases is expected to include an acid corrosion inhibitor.

An alternative fluid which is contemplated for use in one non-limiting aspect of the methods and compositions herein is one for treatment of a subterranean well for enhancement of production such as an aqueous based fluid; e.g., it will be formed using sea water available at the well location, a brine, tap water or similar fluid. The amount of fluid used for the treatment will vary, of course, from well to well, and will be based upon the particular application at hand, and the amount thereof is not particularly critical to the method.

The compositions and methods may also optionally contain iron control agents to prevent corrosion byproducts from precipitating in the reservoir. The dosage varies with the type of iron control agents used. Suitable iron control agents include, but are not necessarily limited to, citric acid, erythorbic acid and sodium erythorbate, nitrilotriacetic acid (NTA) and salts thereof, ethylene diamine tetraacetic acid (EDTA) and salts thereof, and acetic acid.

The invention will be described further in the following illustrative Examples, which are non-limiting and serve only to further illuminate the compositions and methods described herein.

EXAMPLE 1

The research work leading to the compositions and methods described herein started with previous investigations into the use of hydroxyacetic acid to reduce the localized corrosion potential of organic halide-containing methanolic solutions. Various formulations were tried and it was found that the improvement could not be repeated. The results are presented in Table I. A higher protection margin indicates a lower pitting susceptibility. The organic acid was hydroxyacetic acid (glycolic acid). The low oxygen environment is defined as 2 vol % oxygen.

TABLE I

Protection Margin at Different Organic Acid Weight Percentages and pH in a Low Oxygen Environment

| Organic Acid Wt % | pH* | Protection Margin |
|---|---|---|
| 1 | 6.7 | 94 |
| 1.5 | 5.23 | 214 |
| 1.5 | 5.23 | 200 |
| 2 | 5.04 | 191 |
| 3 | 4.55 | 0 |
| 1.8 | 5.8 | 327 |

*The organic acid was a hydroxyacid; the pH was adjusted using a base.

EXAMPLE 2

Looking deeper into the problem, it was discovered that pH as well as water content in the formulation were suitable factors to consider, as well as the addition of the organic hydroxy acid. The results are shown in FIG. 1. Using one standard, a minimum protection margin of 200 mV is suitable in a high oxygen content environment, where a "high oxygen content environment" is defined as 21 vol % oxygen.

FIG. 1 is a CPP graph of potential in mV as a function of current in $mA/cm^2$ showing the effect of pH on polarization of stainless steel in solutions with the same methanol, organic halide and organic hydroxy acid content at a low pH of 4.5 (in gray) and a high pH of 6.7 (in black). The difference between the crossover potential (crossing of forward and backward scan) with the starting potential indicates susceptibility of pitting corrosion. A larger difference means lower susceptibility. The fact that there is no crossing of the black line indicates a zero potential: high pitting susceptibility.

With respect to the compositions and methods described herein, organic hydroxy acids have been identified as effective to reduce pitting corrosion susceptibility of stainless steel in methanolic solutions containing organic halide. Suitable ranges of organic acid, pH and additional water content have been identified. The methods and compositions discussed herein may provide solutions for organic halide-containing products to overcome their high pitting corrosion tendency. By using the approach described herein, an organic halide-containing methanolic solution as described herein may meet customers' requirements concerning material compatibility, with reduced pitting susceptibility. Improvement in pitting corrosion reduction was also achieved for other products tested. It will be appreciated that an optimal condition may need to be identified with every applicable product.

EXAMPLE 3

TABLE II presents data about protection margins for a different organic hydroxy acid weight percentages and pH in a high oxygen (21 vol % oxygen) content environment. A higher protection margin indicates a lower pitting susceptibility.

TABLE II

Protection Margin at Different Organic Acid Weight Percentages and pH in a High Oxygen Environment

| Organic Acid Wt % | pH | Protection Margin |
|---|---|---|
| 1.8 | 5.8 | 143 |
| 3 | 6.7 | 229 |

Many modifications may be made in the present invention without departing from the spirit and scope thereof that are defined only by the appended claims. For example, certain components per se, or combinations of components thereof other than those specifically set out herein may be found by one of routine skill in the art to be particularly advantageous, e.g. different combinations of corrosion inhibitors with different acids, different organic halides, different organic hydroxyacids with certain optional solvents and/or optional acids, surfactants and/or dispersants, etc. other than those mentioned or exemplified are expected to be useful.

The words "comprising" and "comprises" as used throughout the claims is interpreted "including but not limited to".

The present invention may suitably comprise, consist or consist essentially of the elements disclosed and may be practiced in the absence of an element not disclosed. For instance, in one non-limiting embodiment, the methanolic solution may consist essentially of or consist of water, methanol, at least one organic halide, and at least one organic hydroxyacid, and alkaline metal salts thereof, and amine salts thereof.

There is additionally provided in another non-restrictive version, a method of inhibiting corrosion which consists essentially of or consists of contacting a methanolic solution with a metal, where the methanolic solution comprises, consists essentially of or consists of water, methanol, at least one organic halide, and at least one compound selected from the group consisting of an organic hydroxyacid, and/or alkaline metal salts of these organic hydroxyacids, and/or amine salts of these organic hydroxyacids, where corrosion of the metal is inhibited to a greater extent as compared to an otherwise identical methanolic solution absent the at least one compound.

What is claimed is:

1. A methanolic solution comprising:
water;
methanol;
at least one organic halide; and
at least one compound selected from the group consisting of organic hydroxyacids containing 2 to 10 carbon atoms with at least one hydroxyl group and at least one carboxylic acid group, and alkaline metal salts thereof, and amine salts thereof, and combinations thereof;
where:
the methanol proportion ranges from about 5 to about 60 wt %;
the at least one organic halide proportion ranges from about 0.5 to about 70 wt %; and
the at least one compound proportion ranges from about 0.5 to about 10 wt %.

2. The methanolic solution of claim 1 where:
the water proportion ranges from about 0.01 to about 12 wt %.

3. The methanolic solution of claim 1 where the pH of the methanolic solution ranges from about 3.5 to about 8.

4. The methanolic solution of claim 1 where the at least one compound is at least one organic hydroxyacid selected from the group consisting of 2-hydroxyacetic acid (glycolic acid), 2-hydroxypropanoic acid (lactic acid), 3-hydroxypropanoic acid (hydracrylic acid), 2-hydroxybutyric acid (alpha-hydroxybutyric acid), 2-hydroxybutyric acid (beta-hydroxybutyric acid, 4-hydroxybutyric acid (gamma-hydroxybutyric acid), 2-hydroxybenzoic acid (salicylic acid), 3-hydroxybenzoic acid, 4-hydroxybenzoic acid, 3,4,5-trihydroxybenzoic acid (gallic acid), and alkaline metal salts of these organic hydroxyacids, and amine salts of these organic hydroxyacids and combinations thereof.

5. The methanolic solution of claim 1 where the at least one compound is selected from the group consisting of an ethanolamine salt of glycolic acid, a butyl amine salt of glycolic acid, a dibutylamine salt of glycolic acid, and combinations thereof.

6. The methanolic solution of claim 1 where there is an absence of ethanol.

7. The methanolic solution of claim 1 where the solution has improved pitting corrosion with respect to stainless steel when it is in contact with stainless steel as compared with an otherwise identical methanolic solution absent the at least one compound.

8. The methanolic solution of claim 1 where the only corrosion inhibitor in the methanolic solution is the at least one compound.

9. The methanolic solution of claim 1 where the at least one organic halide is selected from the group consisting of quaternary ammonium halides, organic oxazolidinium halides, and combinations thereof.

10. The methanolic solution of claim 1 where the methanol proportion ranges from about 15 wt % to about 70 wt %.

11. A methanolic solution comprising:
water;
methanol in a proportion ranging from about 5 to about 60 wt %;
at least one organic halide in a proportion ranging from about 0.5 to about 70 wt %; and
at least one organic hydroxyacid in a proportion ranging from about 0.5 to about 10 wt %, where the at least one organic hydroxyacid is selected from the group consisting of 2-hydroxyacetic acid (glycolic acid), 2-hydroxypropanoic acid (lactic acid), 3-hydroxypropanoic acid (hydracrylic acid), 2-hydroxybutyric acid (alpha-hydroxybutyric acid), 2-hydroxybutyric acid (beta-hydroxybutyric acid, 4-hydroxybutyric acid (gamma-hydroxybutyric acid), 2-hydroxybenzoic acid (salicylic acid), 3-hydroxybenzoic acid, 4-hydroxybenzoic acid, 3,4,5-trihydroxybenzoic acid (gallic acid), and alkaline metal salts of these organic hydroxyacids, and amine salts of these organic hydroxyacids and combinations thereof, and
where the pH of the methanolic solution ranges from about 3.5 to about 8.

12. The methanolic solution of claim 11 where there is an absence of ethanol.

13. The methanolic solution of claim 11 where the solution has improved pitting corrosion with respect to stainless steel when it is in contact with stainless steel as compared with an otherwise identical methanolic solution absent the at least one compound.

14. The methanolic solution of claim 11 where the only corrosion inhibitor in the methanolic solution is the at least one compound.

15. The methanolic solution of claim 11 where the at least one organic halide is selected from the group consisting of quaternary ammonium halides, organic oxazolidinium halides, and combinations thereof.

16. A methanolic solution consisting of:
water;
methanol;
at least one organic halide; and
at least one compound selected from the group consisting of organic hydroxyacid, and alkaline metal salts thereof, and amine salts thereof, and combinations thereof.

17. The methanolic solution of claim 16 where:
the water proportion ranges from about 0.01 to about 12 wt %;
the methanol proportion ranges from about 5 to about 60 wt %;
the at least one organic halide proportion ranges from about 0.5 to about 70 wt %; and
the at least one compound proportion ranges from about 0.5 to about 10 wt %.

18. The methanolic solution of claim 17 where the at least one compound is selected from the group consisting of an ethanolamine salt of glycolic acid, a butyl amine salt of glycolic acid, a dibutylamine salt of glycolic acid, and combinations thereof.

\* \* \* \* \*